United States Patent [19]

Dopheide

[11] Patent Number: 4,669,876

[45] Date of Patent: Jun. 2, 1987

[54] LASER-DOPPLER-ANEMOMETER

[75] Inventor: Dietrich Dopheide, Braunschweig, Fed. Rep. of Germany

[73] Assignee: Bundesrepublik Deutschland, Braunschweig, Fed. Rep. of Germany

[21] Appl. No.: 703,845

[22] Filed: Feb. 21, 1985

[30] Foreign Application Priority Data

Feb. 21, 1984 [DE] Fed. Rep. of Germany ....... 3406142
Sep. 27, 1984 [DE] Fed. Rep. of Germany ....... 3435423

[51] Int. Cl.$^4$ .......................... G01P 3/36; H01L 31/14
[52] U.S. Cl. ................................. 356/285; 250/214 C; 250/238; 250/370; 250/552
[58] Field of Search ............... 250/370 L, 552, 214 C, 250/238; 356/5, 28.5

[56] References Cited

U.S. PATENT DOCUMENTS

| 3,576,996 | 5/1971 | Stevens | 250/370 L |
|---|---|---|---|
| 3,705,316 | 12/1972 | Burrous et al. | 250/552 |
| 3,755,679 | 8/1973 | Otsuka | 250/552 |
| 3,973,852 | 8/1976 | Moore et al. | 250/552 |
| 4,036,557 | 7/1977 | Christensen | 356/28.5 |
| 4,168,906 | 9/1979 | Schwiesow | 356/28.5 |
| 4,506,979 | 3/1985 | Rogers | 356/28.5 |
| 4,511,249 | 4/1985 | Frungel | 356/5 |

OTHER PUBLICATIONS

Y. Dubnistchev et al., Optics & Laser Tech., Jun. 1976, p. 129.

Primary Examiner—Stephen C. Buczinski
Attorney, Agent, or Firm—Schwartz, Jeffery, Schwaab, Mack, Blumenthal & Evans

[57] ABSTRACT

A laser-doppler-anemometer for measuring the velocities of moving test specimens employing a laser beam source, deflection optics for at least two partial beams, collecting optics for focussing at least one of the partial beams on the test specimen, and a detector for the scattered light radiated from by the moving test specimen. A compact construction and further possible applications can be obtained when the laser beam source is provided by at least one laser diode whose temperature can be adjusted and kept constant with a temperature control circuit.

8 Claims, 7 Drawing Figures

LASER-DOPPLER-ANEMOMETER

BACKGROUND OF THE INVENTION

The invention relates to a laser-doppler-anemometer for measuring the velocities of moving test specimens, with deflection optics for producing at least two partial beams, collecting optics for focussing at least one of the partial beams on the test specimen, and a detector for the scattered light radiated from the moving test specimen.

Such laser-doppler-anemometers are known and their measuring principles are described in detail in "Principles and Practice of Laser-Doppler-Anemometry" by Durst, Melling, Whitelaw, 2nd edition, Academic Press 1981.

In the known laser-doppler-anemometer the beam from a gas laser is split into two partial beams. Using the cross-beam method, the two partial beams are directed at a flowing medium at different angles, where they produce a virtual interference pattern in the measurement volume. The beams passing directly through the measurement volume are cut off, while the beams scattered in another direction from the measurement volume are detected by means of a photomultiplier. The frequency of the scattered light is dependent on the velocity of the moving test specimen, so that a measurement of the flow velocity is possible.

In the reference beam method only one partial beam passes through the measurement volume. The scattered partial beam is made to interfere with a reference beam.

The measurement method of anemometry has the advantage that for practical purposes it can be used on the moving test specimen, which may, for example, take the form of a flowing medium or a moving surface, without producing any reaction at all. It is necessary only that the moving test specimen contain light-scattering particles. These can be added to a gas or liquid flow even before the measurement is made.

The disadvantages of previous anemometers resides primarily in the fact that the necessary inclusion therein of gas lasers make them very bulky and heavy. Moreover, with fixed deflection optics, the laser has to be moved in order to direct the partial beams into the measurement volume, so that an expensive device for moving the gas laser is required. The same applies to the receiving optics.

SUMMARY OF THE INVENTION

The object on which the invention is based is to design a laser-doppler-anemometer of the type mentioned in the introduction which can be constructed compactly in a small space and opens up additional application possibilities.

According to the invention, this object is achieved when the laser beam source is provided by at least one laser diode whose temperature can be adjusted and kept constant with a temperature control circuit.

Thus, the present invention is a laser-doppler-anemometer for measuring the velocity of a moving test specimen comprising a laser-generating means for generating a pair of partial laser beams, the laser-generating means including a laser diode, first optical means for focussing at least one of the partial laser beams on the test specimen, second optical means for collecting components of the at least one partial beam scattered by the test specimen, a detector arranged to receive the collected components, and temperature control means connected to the laser diode for adjustably controlling the temperature of the laser diode.

With the present invention, laser diodes are used for the first time for anemometry. This application is made possible by keeping the temperature of the laser diodes constant using a temperature control circuit. The output frequency of a laser diode is heavily dependent on its temperature. A stable laser frequency suitable for measurement purposes is achieved in the present invention by temperature control of the laser diode. The construction according to the invention offers the additional advantage that the output frequency of the laser beam source can be adjusted. This takes place according to the invention by means of the temperature control circuit which not only enables the temperature of the laser diode to be held at a predetermined value, but also allows it to be adjusted to different values, as a result of which the laser frequency changes. Consequently, advantages are achieved in particular in an arrangement in which several anemometer systems direct partial beams simultaneously at the test specimen to measure several velocity components of the moving test specimen, and in which it is then required that the scattered beams can be separated from each other.

In an embodiment which is particularly advantageous mechanically the laser diode is mounted on a mounting block which incorporates a temperature sensor and an element for generating heat and cold by means of electric current, preferably a Peltier element.

Measurement which is free of complications is achieved with the laser diodes if they are selected so that they operate in the single mode. In this case the coherence length is sufficient to generate the necessary interference patterns.

The use according to the invention of laser diodes as a laser beam source makes it possible to generate the operating current for the laser diode by means of a modulation generator whose frequency can be controlled. This arrangement offers the advantage that the measuring frequency can be displaced by means of the modulation frequency in a manner such that for all measuring frequencies and flow velocities the detection can take place in the same frequency band. This eliminates the former need for switchable filters to remove interference from the signals.

The small size of the laser diode makes it possible in an advantageous arrangement to measure a velocity component lying along the optical axis by positioning the laser diode off of the optical axis and deflecting the beam which passes at an angle through the measurement volume so that it passes through the measurement volume again at a different angle. The detection can then be carried out conveniently along the optical axis.

In conjunction with the conventional arrangement for measuring a velocity component, this arrangement makes it possible to measure three velocity components if three laser beam light sources are provided. Two of the laser beam light sources are positioned on the optical axis in the conventional manner and their partial beams are generated in planes which are rotated through, for example, 90° with respect to one another. The third laser beam light source is positioned off of the optical axis in order to measure the velocity component parallel to the optical axis. In addition, the two laser beam sources positioned on the optical axis radiate on different wavelengths.

The compact arrangement possible according to the invention also allows the measurement of a third velocity component at an angle to the two other velocity components by setting up a conventional anemometer system with its optical axis at an angle to the optical axis of the two other laser beam sources.

In an extremely advantageous development of the invention, the laser beam source is provided by a laser double diode which radiates from a common substrate in directions which are at 180° to each other. In this case the beam splitters required for dividing the light from the laser beam source into two partial beams are not needed, with the result that construction can be made still more compact and simple.

Further objects, features and advantages of the present invention will become apparent from the detailed description of preferred embodiments which follows when considered with the attached figures of drawing.

DETAILED DESCRIPTION OF PREFERRED EMBODIMENTS

Figure 1:
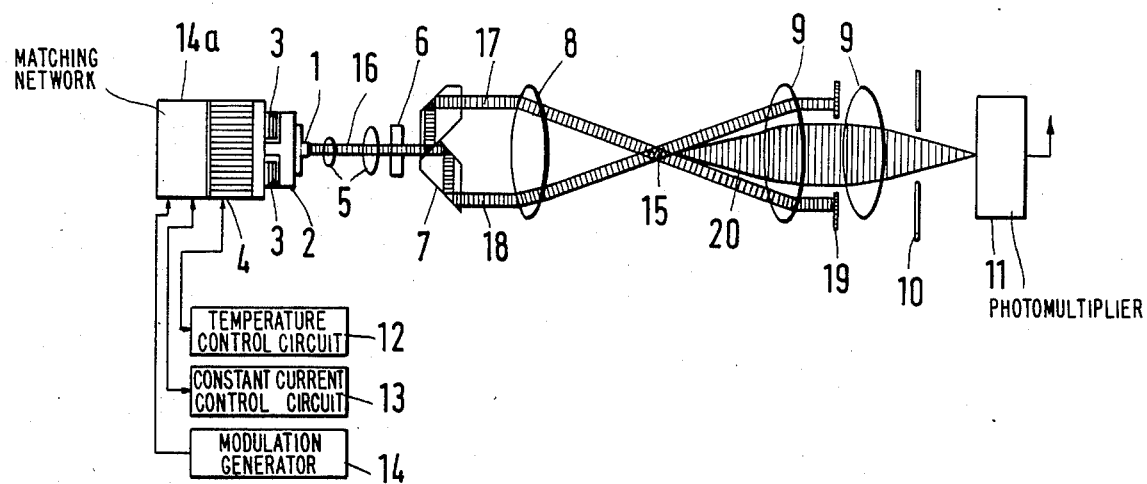
FIG. 1 shows the schematic construction of a laser-doppler-anemometer in accordance with the invention with one laser diode as the laser beam source positioned on the optical axis.

In the basic arrangement shown in FIG. 1, the divergent laser beam 16 emerging from a laser diode 1 is collected into a beam by means of a microscope objective lens or a collecting lens 5 and divided into two parallel partial beams 17, 18 of equal intensity by a beam splitter 7. The partial beams 17, 18 are focussed by mean of a lens 8 at the focussing point 15 which represents the measurement volume of the laser-doppler-anemometer. Those portions of the partial beams 17, 18 which pass unscattered through the measurement volume 15 are collected by beam traps 19. The scattered light 20 emerging from the measurement volume 15 approximately in the direction of the optical axis is directed via lenses 9 and a diaphragm 10 at a photomultiplier 11.

The astigmatism of the beam 16 emerging from the laser diode can be very largely eliminated by an anamorphic prism pair 6 if this is required. Alternatively, in place of the prism pair 6 a system of crossed cylindrical lenses can also be used to achieve an anamorphotic image.

The laser diode 1 is mounted on a mounting block 2 which is in turn attached to Peltier elements 3. The heat generated by the Peltier elements 3 is removed via a heat sink 4. A temperature control circuit 12 is connected to the mounting block 2 and the Peltier elements 3, and carries out a precise temperature stabilization and consequently a wavelength stabilization of the laser diode 1. The set point of the temperature can be adjusted with the temperature control circuit with the result that wavelength control of the laser diode 1 is possible, since the radiated wavelength depends on the temperature of the laser diode 1. The operating current impressed on the laser diode is adjusted by means of a constant current control circuit 13 and fed to a matching network 14a for the laser diode 1, as a result of which the light output of the laser diode 1 can be continuously adjusted.

A modulation generator 14 in conjunction with the network 14a makes frequency and intensity modulation of the laser light possible in the low and high frequency ranges through current modulation around a working point which is preset by the current control circuit 13. This intensity modulation of the laser light beam brings about, in the photomultiplier 11, a frequency mixing of the doppler frequency, which is a measure of the flow velocity, with the frequency of the modulation generator 14. This gives rise to a new method for shifting the frequency of doppler signals, which could not be realized with gas lasers.

It is advantageous if the laser diode 1 only radiates in one transversal mode in order to achieve a measurement volume 15 which has a symmetrical and approximately gaussian intensity distribution. If laser diodes with a beam divergence ratio of less than 1:3 are selected, in most application cases encountered in flow measurement science a reduction of the astigmatism by means of the anamorphic prisms 6 or similar arrangements may be unnecessary.

If laser diodes 1 are used which radiate in several longitudinal modes, one beam splitter 7 used must be path-length compensated so as to produce partial beams 17, 18 which are capable of interference. Laser diodes 1 with only one longitudinal mode require no path-length compensated beam splitters 7 and because of the large coherence length of more than 8 meters which can be achieved are particularly suitable for measuring a velocity component lying along the optical axis, as will be explained in more detail by reference to FIG. 2.

Figure 2:
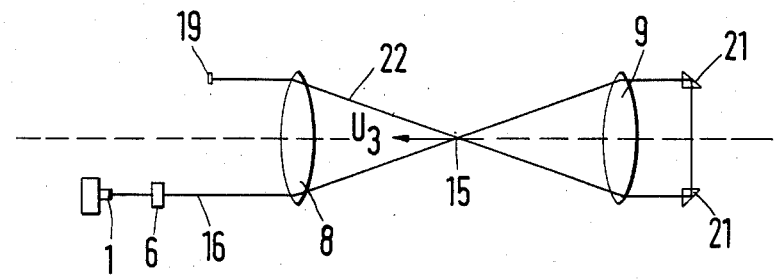
FIG. 2 shows the beam path with the laser diode positioned off the optical axis for measuring a velocity component lying along the optical axis.

FIG. 2 shows an arrangement for measuring the velocity component $u_3$ which lies along the optical axis in which the laser diode 1 is positioned off the optical axis. The laser beam 16 passes through the lens 8 in its peripheral region and is then focussed in the measurement volume 15. The receiving lens 9 again directs the beam parallel to the optical axis, whereupon it is deflected by two prisms 21 by 90° in each case and is focussed back into the measurement volume by the receiving lens 9. After passing through the lens 8 the beam is cut off in the beam trap 19. The detection of the scattered light takes place on the optical axis and is not shown in FIG. 2. The construction shown in FIG. 2 can only be realized with conventional gas lasers under very difficult conditions, because the latter as a rule have only small coherence lengths. The use of laser diodes 1 with only one longitudinal mode makes possible the large coherence lengths even with high light intensity.

Figure 3:
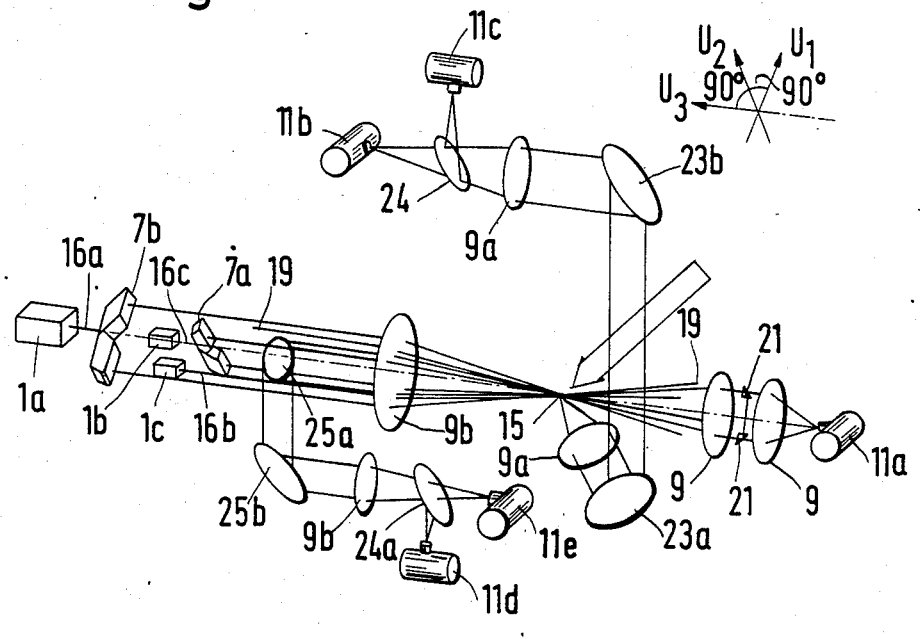
FIG. 3 shows a schematic spatial representation of an arrangement for investigating three velocity components which are orthogonal to each other.

FIG. 3 shows the construction for measuring three velocity components $u_1$, $u_2$ and $u_3$ which are orthogonal to each other. For this purpose two laser diodes 1a and 1b are arranged on the optical axis. Their beams 16a and 16c are split into parallel and paired orthogonal partial beams of equal intensity by means of beam splitters 7a and 7b which are turned at 90° to each other; these partial beams are focussed by the len 8 into the measurement volume 15 and after passing through the measurement volume 15 are cut off by beam traps 19. These beams can be used to measure velocity components $u_1$ and $u_2$ which are orthogonal to each other and which are in turn perpendicular to the optical axis.

To measure the velocity component $u_3$ lying along the optical axis the arrangement explained by reference to FIG. 2 is used, i.e., the laser diode 1c is positioned off of the optical axis. The detection of the scattered light emerging from the measurement volume 15 can take place in the following ways:

(a) analogously to the detection method shown in FIG. 1, with the lenses 9 and a photodetector 11a placed in the optical axis for the wavelength of the laser diode 1b;

(b) at any desired angle to the optical axis by focussing the scattered light by means of the lenses 9a and by deflection by means of the mirrors 23a and 23b. By means of a separator 24 a color separation is undertaken which separates the light components of different frequencies from the laser diodes 1a and 1c. These light components are detected by the photodetectors 11b and 11c.

(c) in the reverse direction along the optical axis the scattered light is focussed by the lens 8 and deflected by the mirrors 25a and 25b. After then being focussed by the lens 9b a color separation of the wavelengths radiated by the laser diodes 1a and 1c takes place by means of the divider 24a. These are detected by the photodetectors 11d and 11e.

Figure 4:
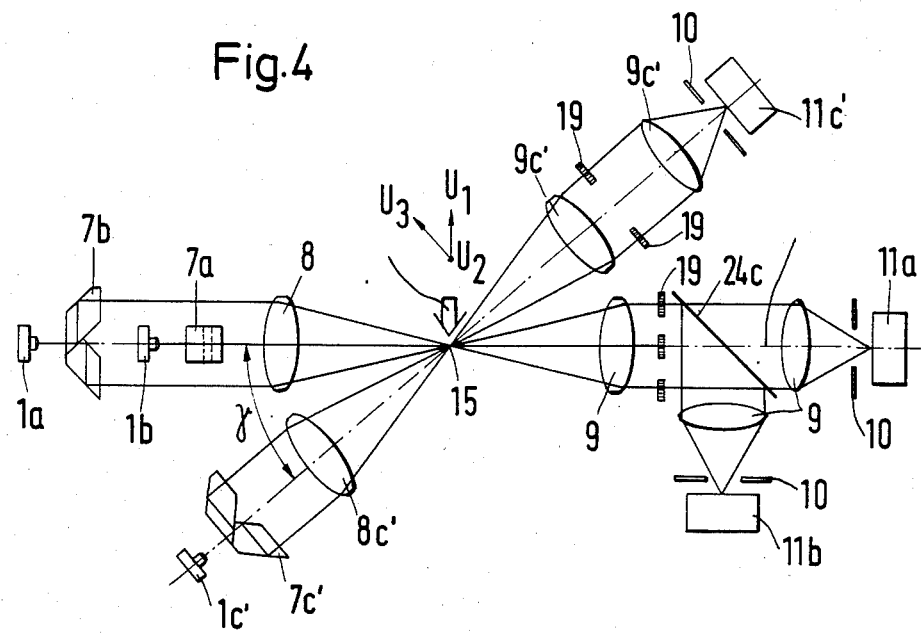
FIG. 4 shows a schematic representation of an arrangement for measuring velocity components which are orthogonal to the optical axis and a third velocity component which is at an angle to the optical axis.

FIG. 4 shows an embodiment in which a third velocity component $u_3$ is measured which is not perpendicular to the velocity components $u_1$ and $u_2$. The arrangement of the laser diodes 1a and 1b along with their beam splitters 7a and 7b on the optical axis is the same as in FIG. 3. The optical axis for the third laser diode 1c' and its beam splitter 7c' is directed perpendicular to the third velocity component $u_3$. The focussing of the partial beams into the measurement volume 15 is done by a lens 8c'. Receiving lenses 9c' collect the scattered light which reaches a photodetector 11c' through a diaphragm 10, while the unscattered beams are cut off in the beam range 19. The optical axis of the laser diodes 1a and 1b are at an angle of 90° to the optical axis of the laser diode 1c'.

Figure 5:
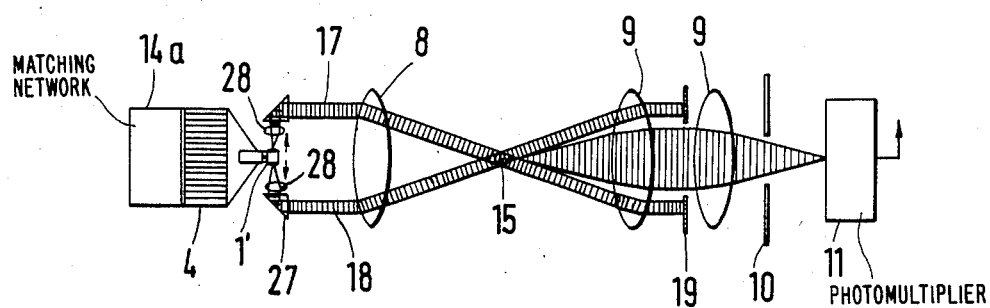
FIG. 5 shows an arrangement analogous to FIG. 1 of a laser-doppler-anemometer using a laser double diode as the laser beam source.

FIG. 5 shows the construction of an anemometer which corresponds to the construction in FIG. 1, but in which the laser diode 1 is replaced by a laser double diode 1' which radiates in two directions turned at 180° to each other. As a result the beam splitter 7 becomes unnecessary because two suitable partial beams 17 and 18 are already emitted by the laser double diode 1'. These partial beams pass in each case through a collecting lens 28 and are directed by 90° deflecting prisms 27 onto the lens 8 which focuses the partial beams 17, 18 on the measurement volume 15. The rest of the construction corresponds to that in FIG. 1. For this reason, the same parts have also been given the same reference numbers.

Figure 6:
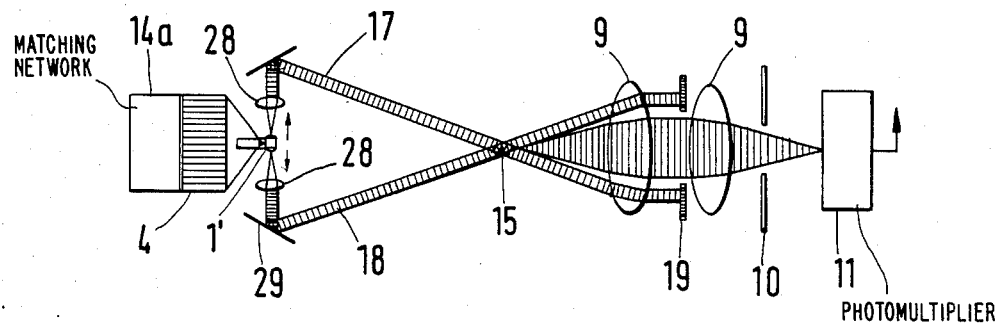
FIG. 6 shows a variant of the arrangement in FIG. 5 formed by removing a focussing lens in front of the measurement volume.

FIG. 6 shows a modified embodiment with a laser double diode 1', in which the two partial beams 17, 18 each pass through a collecting lens 28 which in conjunction with a deflecting mirror 29 each focus the partial beams 17, 18 into the measurement volume 15.

Figure 7:
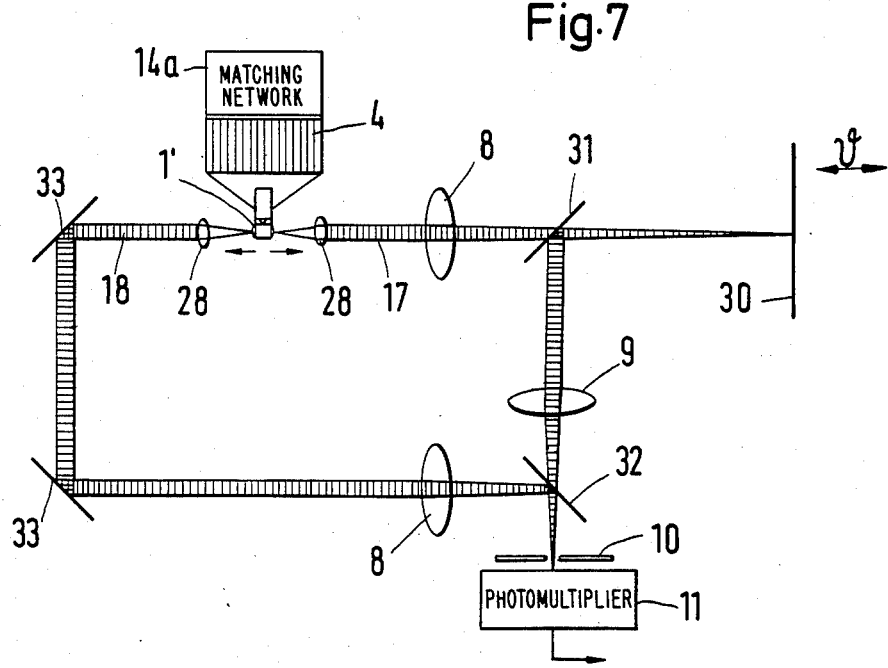
FIG. 7 shows an arrangement of a laser-doppler-anemometer in accordance with the invention with a laser double for carrying out the reference beam method for measuring the velocity of a moving surface.

FIG. 7 shows yet another arrangement of a laser-doppler-anenometer with a laser double diode 1' for measuring the movement of a surface 30 by means of the reference beam method. The two divergent partial beams 17, 18 are again formed into parallel beams by the collecting lenses 28. The partial beam 17 then passes through a focussing lens 8 which focuses the partial beam 17 on the surface 30. When this is done, the partial beam passes through a half-silvered 45° mirror 31 which directs the light reflected from the moving surface 30 through a receiving lens 9 and a diaphragm 10 onto the photomultiplier 11. Before reaching the diaphragm 10 the scattered light passes through a half-silvered mirror 32. The second partial beam 18 is deflected through a total of 180° by two 45° mirrors 33 and focussed by means of a lens 34 on the photomultiplier 11. The reference beam 18 is coupled to the measured beam via the half-silvered mirror 32, with the result that an interference pattern between the scattered beam and the reference beam is produced at the photomultiplier 11. Since the scattered wave is approximately spherical, the measuring apparatus has to operate with a small aperture in order to obtain beams which are capable of interference.

The formation of the laser beam sources according to the invention by the laser diodes 1, 1', 1a, 1b, 1c makes it possible to convert existing laser-doppler-anemometers employing gas lasers, which have been constructed for investigating one velocity component, by adding two laser diode anemometer so that three velocity components $u_1$, $u_2$, $u_3$ can be investigated, for example, in accordance with FIG. 3, with it being possible to retain the gas laser as the laser beam source 1a. Consequently, existing gas laser anemometers can be extended for investigating three velocity components $u_1$, $u_2$, $u_3$ by adding the laser-doppler-anemometers employing laser diodes in accordance with the invention without substantial spatial enlargement.

What is claimed is:

1. A laser-doppler-anemometer for measuring the velocity components of a moving test specimen comprising:
    laser-generating means including a laser double diode which radiates from a common substrate in two opposite directions for generating a pair of partial laser beams;
    first optical means for focussing at least one of said partial laser beams on the test specimen;
    second optics for collecting components of said at least one partial beam scattered by said test specimen;
    a detector arranged to receive said collected components; and
    temperature control means connected to said laser double diode for adjustably controlling the temperature of said laser double diode.

2. A laser-doppler-anemometer as claimed in claim 1, wherein said temperature control means comprises:
    a mounting block on which said laser double diode is mounted;
    a temperature sensor disposed within said mounting block; and
    means, disposed within said mounting block, for alternatively producing and extracting heat in response to an electric current.

3. A laser-doppler-anemometer as claimed in claim 2, wherein said means for producing and extracting heat comprises a Peltier element.

4. A laser-doppler-anemometer as claimed in claim 1, wherein said laser double diode is adapted to operate in a single mode.

5. A laser-doppler-anemometer as claimed in claim 1, further comprising a modulation generator connected to said laser double diode for providing operating current to said laser double diode at a controllable output frequency.

6. A laser-doppler-anemometer as claimed in claim 1, wherein said laser-generating means comprises:
a first laser beam source for generating two first laser beams;
a second laser beam source for generating two second laser beams having a wavelength different from that of said first laser beams;
a third laser beam source for generating two third laser beams;
first means for directing said first laser beams parallel to each other, said first pair of parallel beams defining a first joining plane therebetween;
second means for directing said second laser beams parallel to each other, said second beams defining a second joining plane therebetween which encloses an angle with said first joining plane; and
filter means for separating components of said first pair scattered by said test specimen from components of said second pair scattered by said test specimen, said third layer beam source and at least one of said first and second laser beam sources each comprising a laser double diode.

7. A laser-doppler-anemometer as claimed in claim 6, wherein said first and second optics comprise first and second convex lenses, respectively, having a common optical axis, and wherein said laser double diode of said third laser beam source is positioned off of said optical axis and is adapted to produce a beam parallel to said optical axis to be directed by said first convex lens through the test specimen in at an angle to said optical axis, said beam thereafter intercepting an edge of said second convex lens thus to be realigned with said optical axis.

8. A laser-doppler-anemometer as claimed in claim 6, wherein the third laser beam source and an associated detector system from an optical axis which passes through said test specimen at an angle to an optical axis defined by said first and second laser beam sources.

* * * * *